United States Patent

Happel et al.

[15] 3,649,800
[45] Mar. 14, 1972

[54] APPARATUS FOR WELDING CAN BODIES

[72] Inventors: William J. Happel, Pittsburgh; Kenneth E. Opal, Oakmont, both of Pa.

[73] Assignee: Power Control Corporation, Pittsburgh, Pa.

[22] Filed: Jan. 8, 1970

[21] Appl. No.: 1,391

[52] U.S. Cl. .................................................. 219/64, 219/82
[51] Int. Cl. .......................................................... B23k 11/06
[58] Field of Search ............... 219/64, 59, 82, 119, 117, 108, 219/62

[56] References Cited

UNITED STATES PATENTS

| | | | |
|---|---|---|---|
| 2,280,111 | 4/1942 | Widell | 219/64 |
| 2,850,620 | 9/1958 | Wenthe | 219/82 X |
| 1,225,373 | 5/1917 | Thompson | 219/117 |
| 1,944,863 | 1/1934 | Gillette et al. | 219/82 |
| 3,521,025 | 7/1970 | Opal | 219/108 X |

*Primary Examiner*—R. F. Staubly
*Assistant Examiner*—J. G. Smith
*Attorney*—Brown, Murray, Flick & Peckham

[57] ABSTRACT

Described is a welding head arrangement for resistance seam welding of can bodies and the like at extremely high speeds, and characterized in that the head comprises a stationary rail member and a cooperating arcuate member which passes over the seams of successive can bodies in opposite directions. In this manner, the arcuate member need never make a complete revolution; and problems encountered in attempting to make electrical contact with a rotating element at the extremely high amperages required are eliminated.

3 Claims, 3 Drawing Figures

PATENTED MAR 14 1972 3,649,800

INVENTORS
WILLIAM J. HAPPEL
KENNETH E. OPAL
BY
Brown, Murray, Flick & Peckham

ATTORNEYS

APPARATUS FOR WELDING CAN BODIES

BACKGROUND OF THE INVENTION

While not limited thereto, the present invention is particularly adapted for use in the welding of can bodies. In the past, most cans have been formed from tin plate sheets which are formed into a cylindrical shape and the two edges of the sheets joined along a seam formed by overlapping, reversely bent portions. This seam is then soldered and tinned; and in modern can-forming equipment, the entire process of joining, soldering and tinning can be achieved at a production rate of up to 500 cans per minute.

Recently, it has been found that plain "black plate" instead of tin plate, can be coated with various resins to provide satisfactory can bodies. Instead of forming a seam by overlapping reversely bent portions which must then be soldered and tinned, the seam in a black plate can body can be formed by welding overlapping edges of a flat sheet formed into a cylinder. This results in a small, but highly significant savings in metal. While welded can bodies have many advantages, they have not found acceptance to date, the reason being that the production rate of such cans is lower than soldered cans because of limitations in existing welding equipment.

In the manufacture of welded can bodies, a flat sheet of black plate is initially formed around a mandrel into a cylindrical shape with the edges of the sheet overlapping to form a seam. The overlapped edges of the can body can then pass between rollers forming the opposite electrodes of a welding head; however at the extremely high welding speeds and the high currents required, on the order of 3,000 amperes at speeds of 8 cans per second, difficulties are encountered in making electrical contact with the rotating electrodes without excessive arcing. Attempts have been made to make electrical contact by means of a mercury bath surrounding a shaft on which the rotating electrodes is mounted; however, again due to the high amperages required, the mercury bath will vaporize.

SUMMARY OF THE INVENTION

As an overall object, the present invention seeks to provide a new and improved welding head for can bodies and the like comprising a pair of electrodes, one of which is stationary and the other of which rotates through an arc, but not through a complete revolution.

Another object of the invention is to provide a welding head of the type described wherein a direct electrical connection is made to both electrodes, without the necessity for brushes or the like and attendant arcing problems.

In accordance with the invention, a welding arrangement for can bodies and the like is provided comprising a mandrel around which a can body is formed from a sheet of metal with the edges of the sheet overlapping to form a seam. Mounted on the mandrel and beneath the seam is a first stationary welding electrode in the form of a rail; and above the seam is a second electrode having a lower arcuate surface rotatable through an arc about an axis which moves along the length of the can body whereby the arcuate surface will progressively engage the seam from one end of the can body to the other. In this manner, the arcuate surface of the upper electrode makes progressive point contact with the seam along the length of the can body.

Preferably, and in accordance with copending application, Ser. No. 766,533, filed Oct. 10, 1968, now U.S. Pat. No. 3,521,025 and assigned to the assignee of the present application, a steady state direct current of relatively high amplitude is impressed across the electrode which is sufficient to raise the temperature of the metal to a point slightly below its melting temperature; while high frequency direct current pulses are superimposed on the steady state direct current, the pulses being of sufficient magnitude to raise the temperature of the metal to its fusion temperature and thus produce along the seam a line of contiguous weld points as the arcuate surface of the upper electrode passes over the seam. After the electrode has moved across the seam in one direction, a welded can body is removed from the mandrel, a new can body formed, and the welding process repeated, except that in this case the electrode passes over the can body in the opposite direction.

The above and other objects and features of the invention will become apparent from the following detailed description taken in connection with the accompanying drawings which form a part of this specification, and in which.

Figure 3:
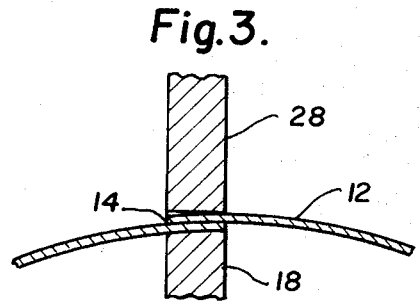
FIG. 3 is a cross-sectional enlarged view of the welded seam formed by the apparatus of FIGS. 1 and 2.

With reference to the drawings, there is shown a cylindrical mandrel 10 around which a sheet of metal 12 is formed to provide a cylindrical can body having overlapping edges 14 as shown in FIG. 3. The mandrel 10 comprises a central core 16 provided with an upper rail electrode 18. Insulating material 20 surrounds the mandrel 10 except in the area of the electrode 18; and around the insulating material 20 is the can body 12 formed into a cylinder by forming equipment, not shown herein.

Figure 1:
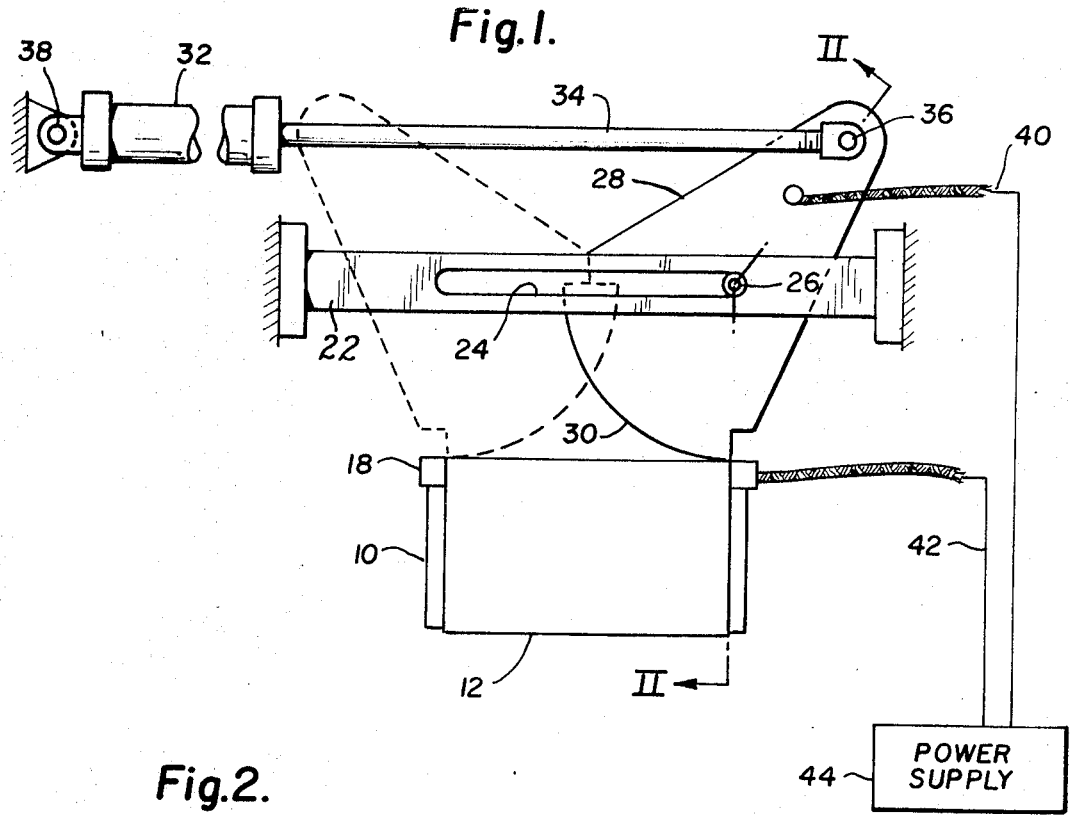
FIG. 1 is a schematic elevational view of the welding arrangement of the present invention.
Figure 2:
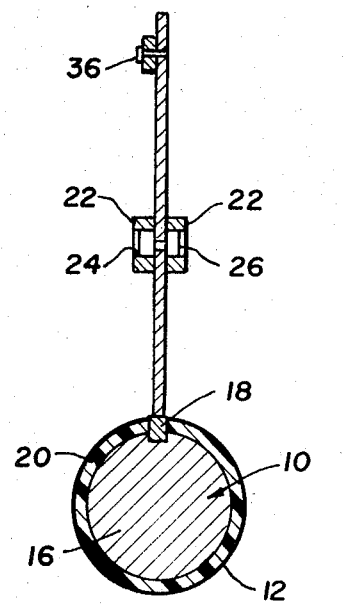
FIG. 2 is a cross-sectional view taken substantially along line II—II of FIG. 1.

Above the rail 18 are tracks or guideways 22 having slots 24 which receive rollers 26. The rollers are mounted on either side of an upper electrode 28 having a lower arcuate surface 30. The center point of the radius of the lower arcuate surface 30 is the axis of the rollers 26. Hence, as the rollers 26 move from right to left as viewed in FIG. 1, the lower arcuate surface 30 will make progressive point contact with the overlapped edges 14 of the can body.

The means for moving the lower arcuate surface 30 over the overlapped edges 14 includes a hydraulic cylinder 32 or the like having a piston rod 34 pivotally connected to the upper end of the electrode 28 as at 36. The cylinder 32 is likewise pivotally connected as at 38 to a stationary support. With the arrangement shown, and as the piston rod 34 moves to the left in FIG. 1, the rollers 26 will be caused to traverse the guideways or slots 24 from right to left until the electrode 28 reaches the dotted line position shown wherein the arcuate surface 30 has rolled over the entire length of the overlapped edges 14. In so doing, the piston rod 34 will move upwardly and then downwardly; however this is facilitated by virtue of the pivotal connection of the cylinder 32 at 38. After the can body is thus welded, it is removed from the mandrel 10; a new can body formed on the mandrel, and the cylinder 32 pressurized to force the piston rod 34 to the right as viewed in FIG. 1, thereby causing the arcuate surface 30 to move across the overlapped edges 14 of the succeeding can body in the opposite direction. This process is repeated each time a can is formed with the electrode moving back and forth at high speed (i.e., up to 8 strokes per second).

The upper electrode 28 and the lower electrode 18 are connected through leads 40 and 42, respectively, to a power supply 44 which is preferably of the type shown in copending application, Ser. No. 766,533, filed Oct. 10, 1968, now U.S. Pat. No. 3,521,025 and assigned to the assignee of the present application. The power supply 44 supplies a steady state direct current of about 3,000 amperes having superimposed thereon high frequency direct current pulses each of about 1,000 amperes in magnitude and a frequency above 1,000 cycles per second. At production rates of about 500 cans per minute, the frequency of the pulses superimposed on the direct current should be about 1.6 kilocycles.

With the arrangement shown, it can be seen that extremely high welding speeds can be achieved; but at the same time a direct electrical connection can be made to both electrodes 18 and 28 without the necessity for brushes or other sliding contact means which can cause excessive arcing problems.

Although the invention has been shown in connection with a certain specific embodiment, it will be readily apparent to those skilled in the art that various changes in form and arrangement of parts may be made to suit requirements without departing from the spirit and scope of the invention. In this respect, it will be appreciated that while the arcuate surface 30 extends through about 90° in the embodiment of the invention shown herein, increasing the length of the radius between surface 30 and the axis of roller 26 will decrease the required stroke of cylinder 32.

We claim as our invention:

1. A welding arrangement for can bodies and the like, comprising a substantially horizontal mandrel, a stationary rail-type welding electrode mounted on top of the mandrel and extending lengthwise thereof, the mandrel being adapted to support an encircling sheet of metal having overlapping edges forming a seam above said rail, a movable welding electrode above said rail having a lower end for engaging said seam, means connected to the upper end of the movable electrode for reciprocating the upper end lengthwise of the rail, pivot means below said reciprocating means projecting laterally from the central portion of the movable electrode, the lower end of the movable electrode forming an arc having said pivot means at its center for rocking back and forth along the rail as the upper end of the movable electrode is reciprocated, stationary means between said rail and the upper end of the movable electrode and extending lengthwise of the rail for guiding said pivot means parallel to the rail as the upper end of the movable electrode is reciprocated, the stationary guiding means including a rigidly mounted member parallel to said rail and provided with a vertical longitudinal slot therethrough slideably receiving said movable electrode, said member being provided with horizontal longitudinal slots at opposite sides of the vertical slot, the pivot means include rollers disposed in said horizontal slots for movement along them, and means for electrically connecting said welding electrodes to a source of electric power.

2. The welding arrangement of claim 1 in which the stationary guide means include a pair of spaced guideways between which the movable welding electrode is disposed.

3. The welding arrangement of claim 2 in which the rollers are mounted on opposite sides of the movable welding electrode and which rollers engage the corresponding guideways, whereby the rollers move along the guideways to hold the electrode in welding contact with the overlapping edges being seam welded.

* * * * *